(12) United States Patent
Greathouse et al.

(10) Patent No.: US 9,121,485 B2
(45) Date of Patent: Sep. 1, 2015

(54) TORQUE CONVERTER WITH DEFLECTABLE SEAL

(71) Applicants: Schaeffler Technologies GmbH & Co. KG, Herzogenaurach (DE); ALLISON TRANSMISSION, INC., Indianapolis, IN (US)

(72) Inventors: Wilbert Greathouse, Canton, OH (US); Richard Bednar, Cleveland, OH (US); John Carrier, Westfield, OH (US); Rashid Farahati, Copley, OH (US); Jeremy Vanni, Sterling, OH (US); Brian Zaugg, Millersburg, OH (US); Jerry Munk, Zionsville, IN (US); Bruce E. Fox, Indianapolis, IN (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/246,214

(22) Filed: Apr. 7, 2014

(65) Prior Publication Data
US 2014/0216880 A1 Aug. 7, 2014

Related U.S. Application Data

(62) Division of application No. 13/173,813, filed on Jun. 30, 2011, now Pat. No. 8,839,923.

(60) Provisional application No. 61/360,382, filed on Jun. 30, 2010.

(51) Int. Cl.
F16H 45/02 (2006.01)

(52) U.S. Cl.
CPC ........ *F16H 45/02* (2013.01); *F16H 2045/0205* (2013.01); *F16H 2045/0226* (2013.01); *F16H 2045/0247* (2013.01); *F16H 2045/0278* (2013.01); *F16H 2045/0294* (2013.01)

(58) Field of Classification Search
CPC ............ F16H 45/02; F16H 2045/0205; F16H 2045/0226; F16H 2045/0247; F16H 2045/0278; F16H 2045/0294
See application file for complete search history.

(56) References Cited

U.S. PATENT DOCUMENTS

| 4,333,552 A | 6/1982 | LaMarche |
| 4,423,803 A | 1/1984 | Malloy |
| 4,427,099 A | 1/1984 | Van Ee |
| 4,441,595 A | 4/1984 | Lamarche |
| 2007/0251788 A1* | 11/2007 | Heck et al. ............ 192/3.3 |

FOREIGN PATENT DOCUMENTS

DE 102008048031 3/2010

* cited by examiner

*Primary Examiner* — Jacob S Scott
(74) *Attorney, Agent, or Firm* — Kathryn A. Warner; Kevin L. Parks

(57) ABSTRACT

A torque converter assembly comprises: a cover for driving engagement with a prime mover; a piston plate including an annular surface for engaging a clutch; and, a sealing plate comprising a substantially radial wall arranged between the cover and the piston plate and disposed radially inward of the annular surface, wherein: in a lockup mode for the torque converter, the sealing plate blocks fluid flow between the cover and the piston plate; and, in a release mode for the torque converter, the sealing plate is deflectable to enable a fluid flow between the cover and the piston plate via a pathway between the cover and the sealing plate.

17 Claims, 8 Drawing Sheets

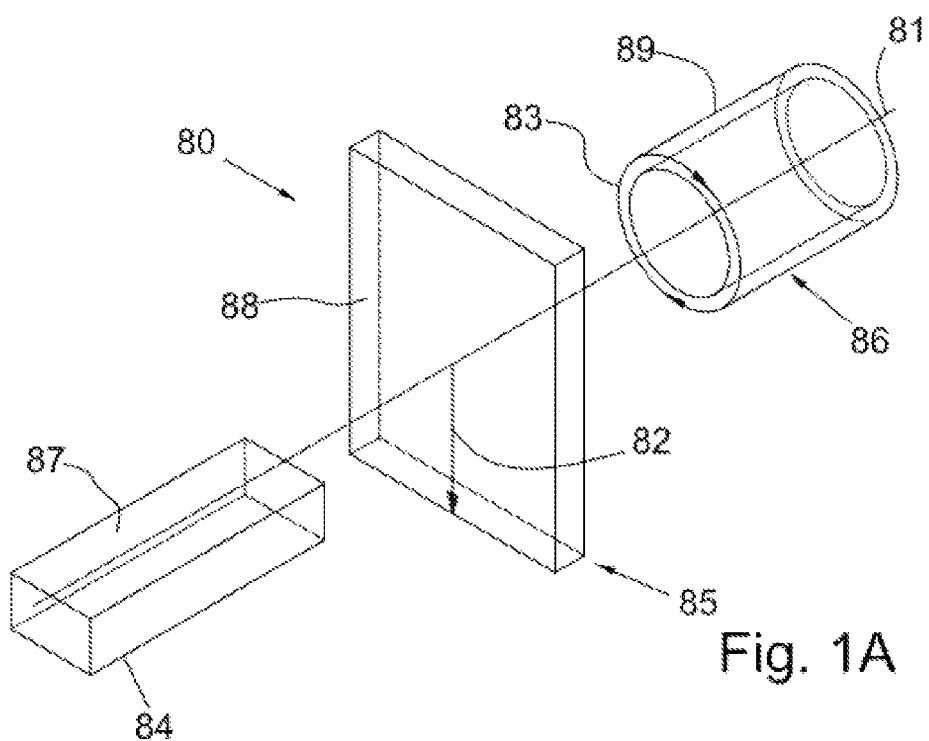
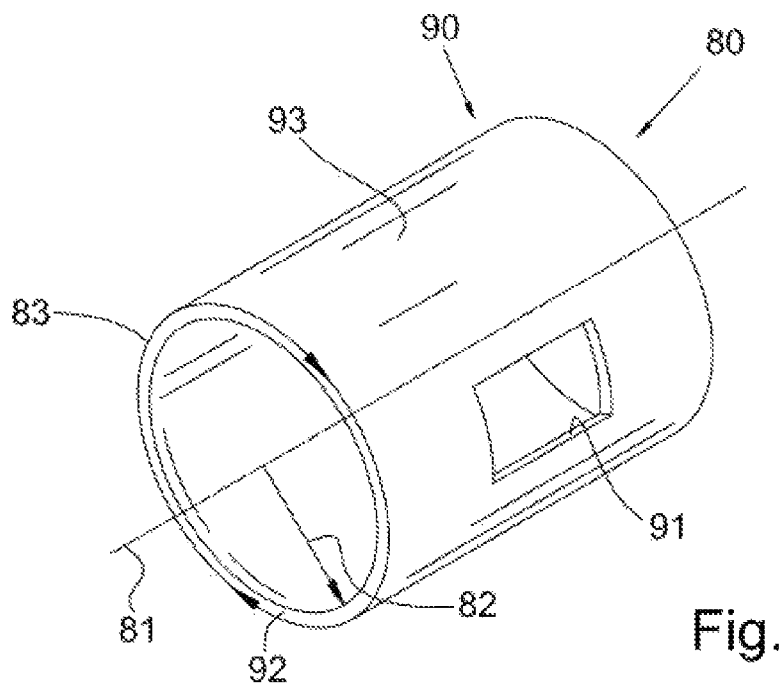

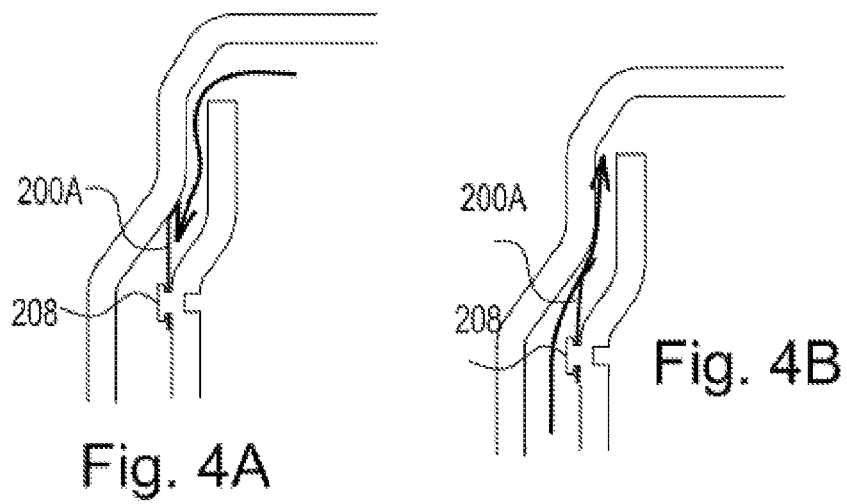
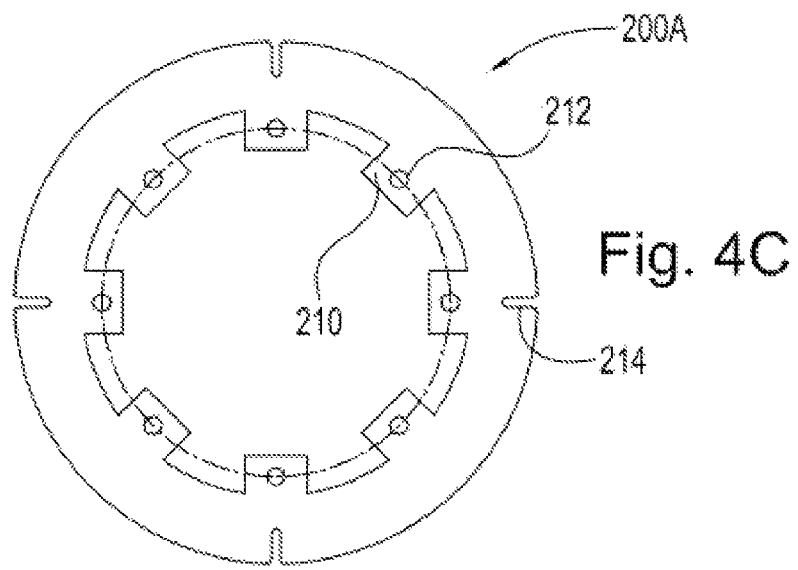

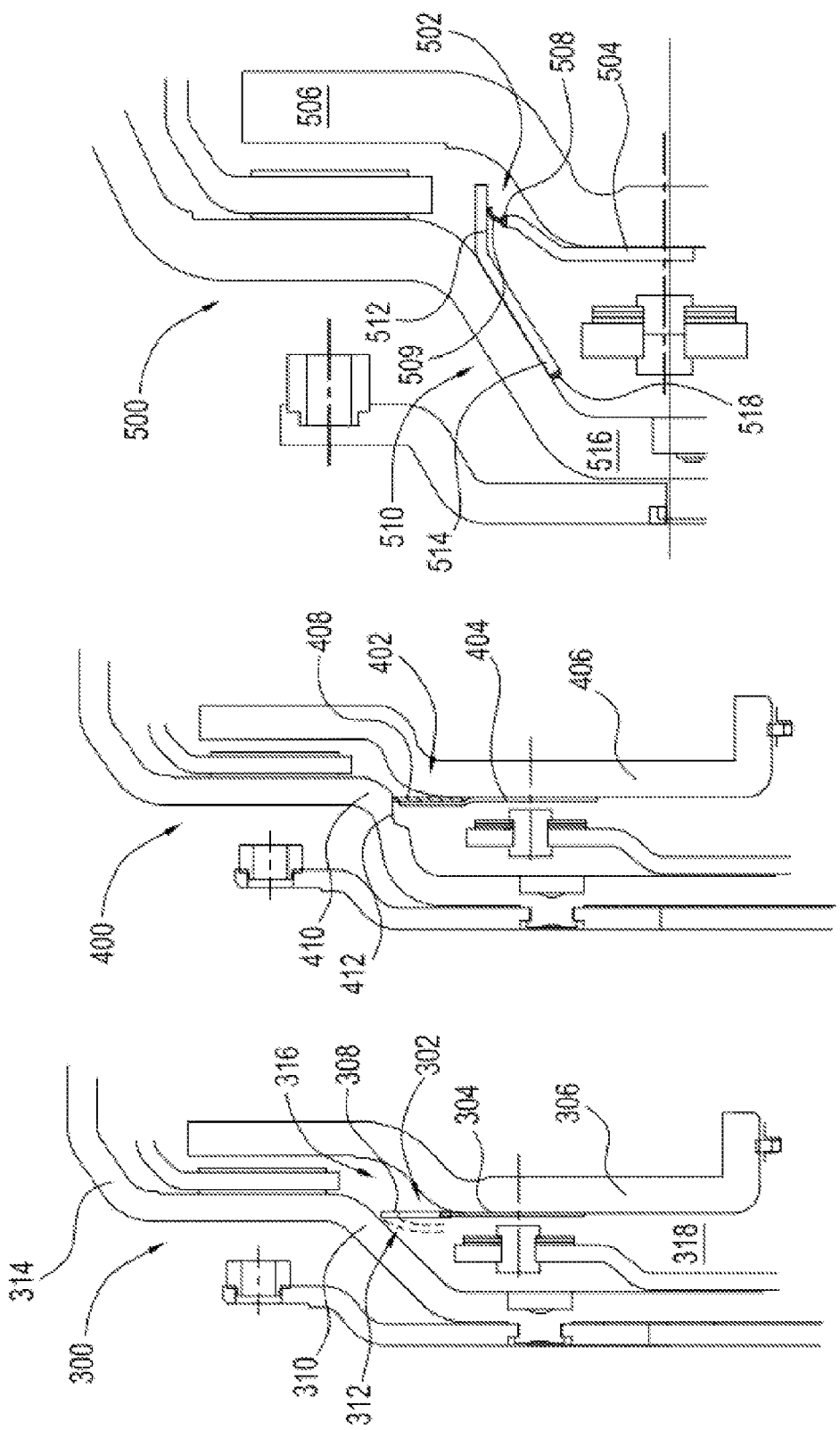

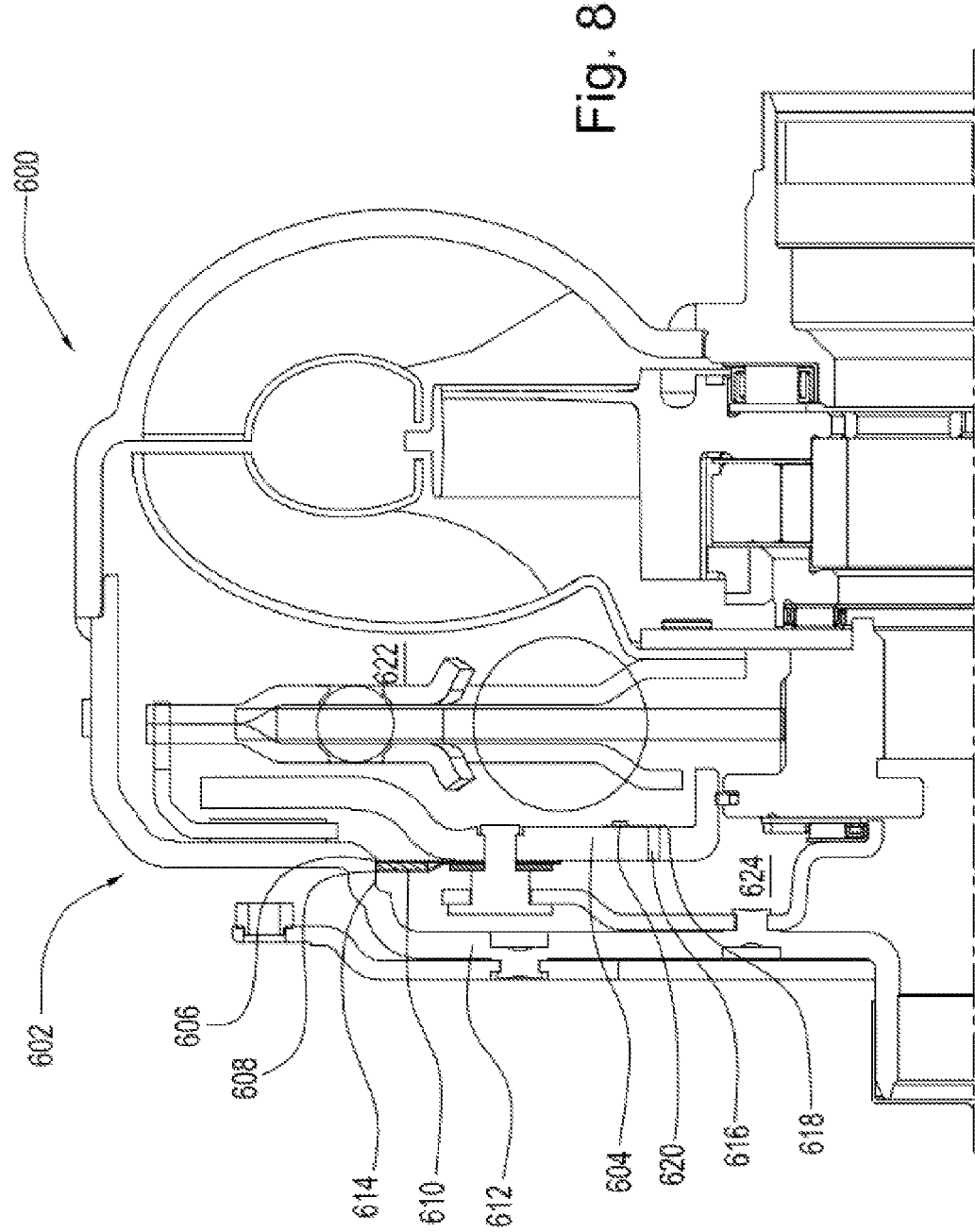

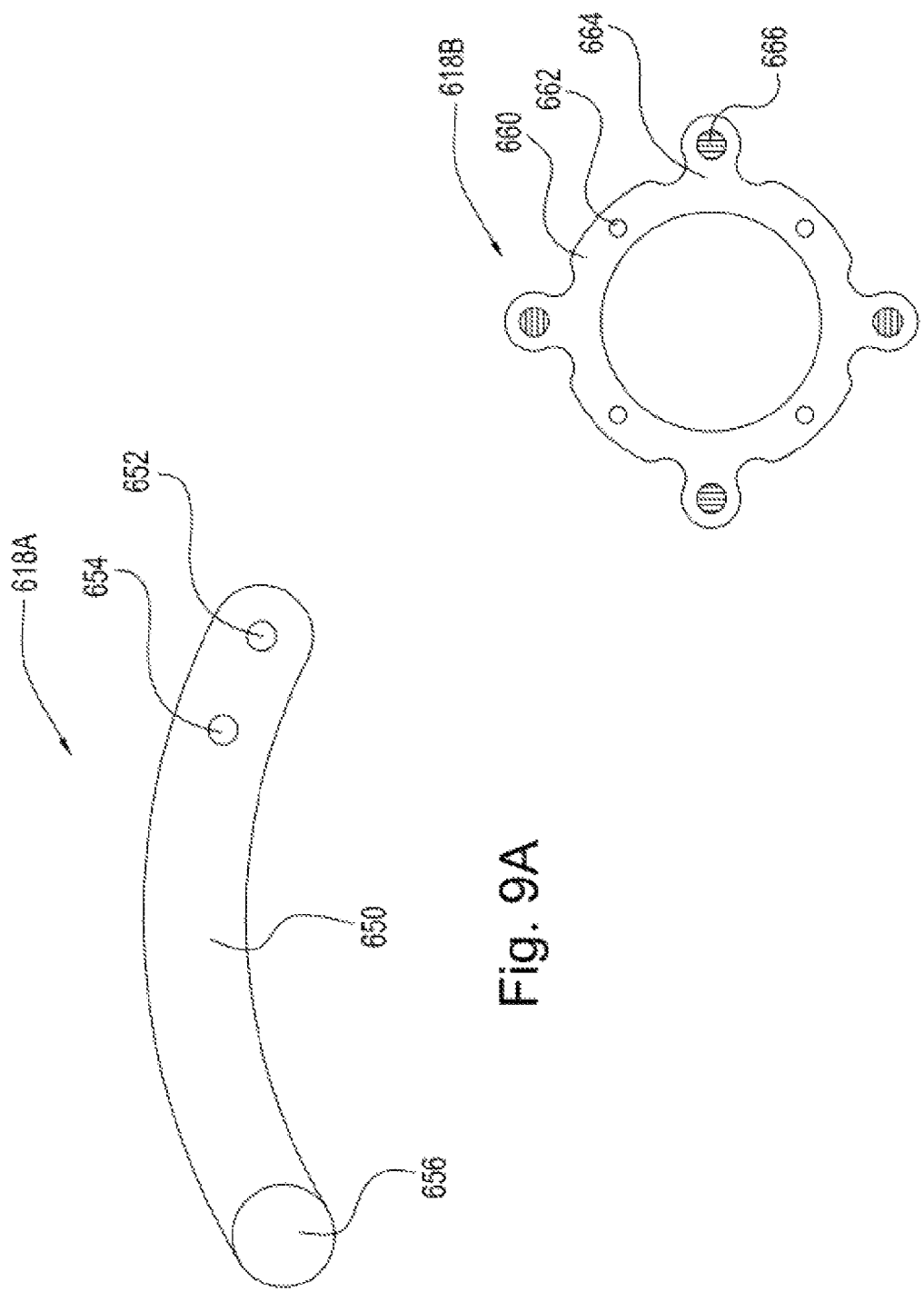

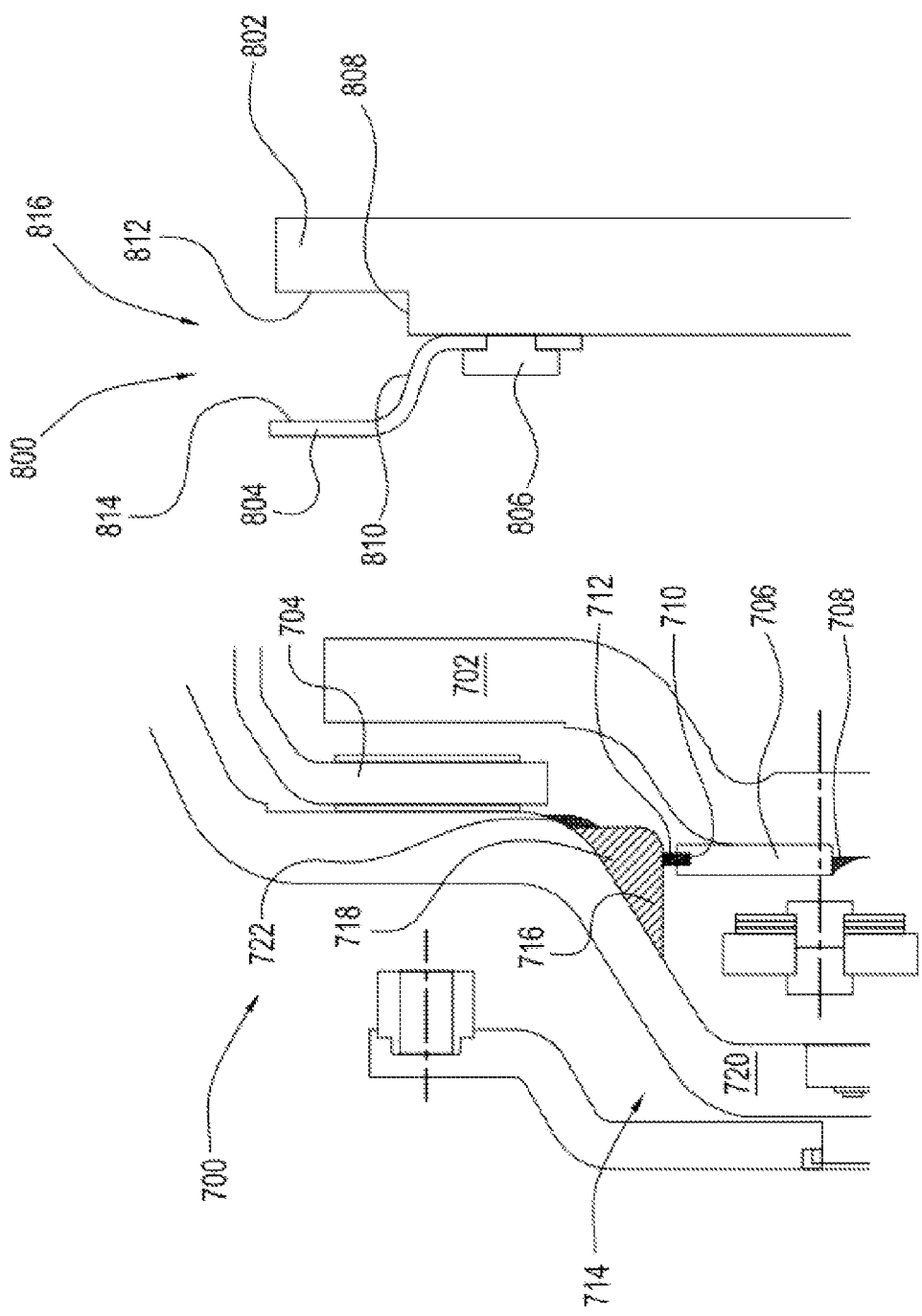

TORQUE CONVERTER WITH DEFLECTABLE SEAL

CROSS-REFERENCE TO RELATED APPLICATIONS

This application is a divisional of application Ser. No. 13/173,813, filed on Jun. 30, 2011, which claims the benefit of U.S. Provisional Application No. 61/360,382 filed on Jun. 30, 2010, which applications are incorporated herein by reference.

FIELD

The invention relates generally to a torque converter, and more specifically to a torque converter with a deflectable seal.

BACKGROUND

Torque converters with seals are known. One example is shown in German Patent Application Publication DE 10 2008 048 031 A1.

BRIEF SUMMARY

Example aspects broadly comprise a torque converter assembly including a cover for driving engagement with a prime mover, a piston plate including an annular surface for engaging a clutch, and a first seal disposed radially inward of the annular surface. In a lockup mode for the torque converter, the first seal blocks fluid flow through an orifice in the piston plate or between the cover and the piston plate and, in a release mode for the torque converter, the first seal is deflectable to enable a fluid flow through the orifice or between the cover and the piston plate and around the first seal. In an example embodiment, the torque converter assembly includes an apply chamber, the piston plate is displaceable in response to fluid pressure in the apply chamber, and the first seal is arranged to be deflected by the fluid pressure in the apply chamber.

In some example embodiments, the torque converter assembly includes a sheet metal plate fixed to the piston plate. In some example embodiments, the first seal is fixed to the sheet metal plate and arranged for sealing engagement with the cover. In an example embodiment, the first seal includes a flap portion deflectable to block the fluid flow between the cover and the piston plate, or through the piston plate orifice, or, enable the fluid flow between the cover and the piston plate, or through the piston plate orifice.

In some example embodiments, the first seal includes a sheet metal ring fixed to one of the piston plate or the cover and arranged for sealing engagement with the other of the piston plate or the cover when the torque converter is in the lockup mode. In an example embodiment, during the lockup mode, the sheet metal ring is in contact with the other of the piston plate or the cover. In an example embodiment, the first seal has a sealing portion including rubber or friction material bonded to the sheet metal ring and, during the lockup mode, the sealing portion is in contact with the other of the piston plate or the cover.

In some example embodiments, the first seal includes a sheet metal plate and friction material bonded to the sheet metal plate. In the lockup mode, the friction material blocks the fluid flow through the piston plate orifice and, in the release mode, the friction material is displaceable to enable the fluid flow through the piston plate orifice. In some example embodiments, the torque converter includes a second seal assembly having a seal plate fixed to the piston plate and a second seal sealingly engaged with the cover. In an example embodiment, the seal plate includes an annular groove and the second seal is disposed in the groove. In an example embodiment, the seal plate includes a portion of an annular groove, the piston plate includes a portion of the annular groove, and the second seal is disposed in the groove.

Other example aspects broadly comprise a torque converter assembly including a cover for driving connection to a prime mover, an impeller drivingly connected to the cover, a piston plate, first and second chambers, and a deflectable seal fixed to one of the cover or the piston plate. The first chamber is at least partially defined by the cover and the piston plate and the second chamber is at least partially defined by the cover, the impeller, and the piston plate. In a first position, the deflectable seal is disengaged from the other of the cover or the piston plate to enable a flow around the seal from the first chamber to the second chamber. In a second position, the deflectable seal is engaged with the other of the cover or the piston plate to block a flow from the second chamber to the first chamber.

In an example embodiment, the torque converter assembly includes a sheet metal plate fixed to the piston plate. The deflectable seal is fixed to the sheet metal plate, arranged for sealing engagement with the cover, and includes a flap portion. The flap portion is deflectable to enable the flow from the first chamber to the second chamber or block the flow from the second chamber to the first chamber. In some example embodiments, the deflectable seal includes a sheet metal ring fixed to one of the piston plate or the cover and arranged for sealing engagement with the other of the piston plate or the cover to block the flow from the second chamber to the first chamber. In an example embodiment, the deflectable seal includes a sealing portion bonded to the sheet metal ring and contactable with the other of the piston plate or the cover to block the flow from the second chamber to the first chamber.

In some example embodiments, the torque converter assembly includes a second seal assembly having a seal plate fixed to the piston plate and a second seal sealingly engaged with the cover to block the flow between the chambers. In an example embodiment, the seal plate includes an annular groove and the second seal is disposed in the groove. In an example embodiment, the seal plate includes a portion of an annular groove, the piston plate includes a portion of the annular groove, and the second seal is disposed in the groove.

Other example aspects broadly comprise a torque converter assembly including a cover for driving connection to a prime mover, a piston plate, and a seal disposed between the cover and the piston plate, fixed to one of the cover or the piston plate, and including an orifice and/or at least one radial slot. In a first position, the seal is disengaged from the other of the cover or the piston plate to enable a flow around the seal between the cover and the piston plate. In a second position, the seal is engaged with the other of the cover or the piston plate to block the flow between the cover and the piston plate with the exception of a flow through the orifice and/or the at least one radial slot.

BRIEF DESCRIPTION OF THE DRAWINGS

The nature and mode of operation of the present invention will now be more fully described in the following detailed description of the invention taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 4A is a schematic view of the torque converter of FIG. 2 with a deflectable sealing plate shown in an apply state, according to an example aspect;

FIG. 4B is a schematic view of the torque converter of FIG. 2 with a deflectable sealing plate, shown in a release state, according to an example aspect;

FIG. 4C is a back view of the seal shown in FIG. 4B;

FIG. 5 is a top half cross-sectional view of a portion of a clutch assembly with a deflectable seal, according to an example aspect;

FIG. 6 is a top half cross-sectional view of a portion of a clutch assembly with a deflectable seal, according to an example aspect;

FIG. 7 is a top half-cross sectional view of a portion of a clutch assembly with a deflectable seal, according to an example aspect;

FIG. 8 is a top half cross-sectional view of a torque converter with a clutch assembly having a deflectable seal, according to an example aspect;

FIG. 9A is a front view the seal of FIG. 8;

FIG. 9B is a front view of an alternative embodiment of the seal of FIG. 8;

FIG. 10 is a cross-sectional view of a portion of a clutch assembly, according to an example aspect;

FIG. 11 is a cross-sectional view of a portion of a clutch assembly, according to an example aspect.

DETAILED DESCRIPTION

Figure 2:
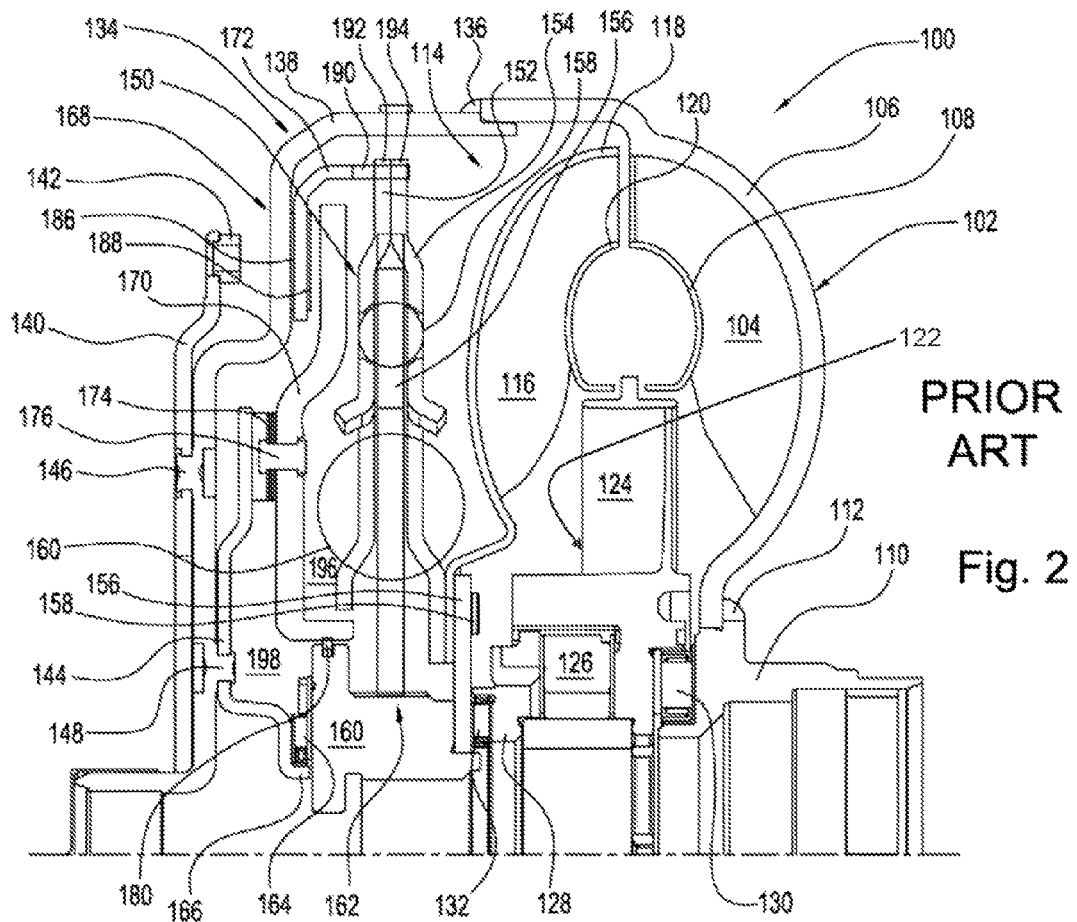
FIG. 2 is a top half cross-sectional view of a prior art torque converter.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a top half cross-sectional view of prior art torque converter 100. Torque converter 100 includes impeller assembly 102 with blades 104, shell 106, core ring 108 and impeller hub 110. Hub 110 is fixed to shell 106 by weld 112. Hub 110 is for sealing to a transmission (not shown) and drivingly engaging a transmission pump (not shown). Converter 100 further includes turbine assembly 114 with blades 116, shell 118, and core ring 120.

Stator assembly 122 is axially disposed between impeller assembly 102 and turbine assembly 114. Assembly 122 includes housing 124, one-way clutch 126, and side plate 128. Clutch 126 may be a roller or sprag design as is commonly known in the art. Thrust bearings 130 and 132 are disposed on opposite axial sides of stator assembly 122.

Converter 100 includes cover assembly 134 fixedly attached to impeller assembly 102 at weld 136. Cover 134 includes shell 138, drive plate 140 with lugs 142, and drive plate 144. Plates 140 and 144 are attached to shell 138 at respective rivets 146 and 148. One or both of rivets 146 and 148 may be extruded rivets as is commonly known in the art.

Damper assembly 150 is disposed within converter 100. Assembly 150 includes cover plates 152 and 154, flange 156, and elastic elements 158 and 160. Elements 158 and 160 are in driving engagement with plates 152 and 154, and flange 156. That is, elements 158 and 160 transmit torque from plates 152 and 154 to flange 156. Elements 158 and 160 may be coil springs, for example. Plate 154 is attached to shell 118 and thrust plate 156 by rivet 158. Flange 156 is drivingly engaged with damper hub 160 at spline 162. Bearing 164 is disposed axially between hub 160 and drive plate 144, and radially positioned by axial extension 166 of plate 144.

Clutch assembly 168 transmits torque from cover 134 to damper 150. Clutch 168 includes piston plate 170 and clutch plate 172. Piston plate 170 may be an annular plate. Piston plate 170 is drivingly engaged to drive plate 144 by leaf springs 174 and rivet 176. Piston plate 170 is sealed to damper hub 160 with dynamic seal 180. Clutch plate 172 is axially disposed between piston plate 170 and cover 134. Plate 172 includes friction material rings 186 and 188 disposed on axially opposite sides of plate 172. Plate 172 further includes tabs 190 for engaging complementary tabs 192 and 194 in respective cover plates 172 and 174.

Piston plate 170 and damper hub 160 separate chambers 196 and 198 of torque converter 100. Chamber 196 may be referred to as an apply chamber and is at least partially defined by impeller 102, cover 134, and piston plate 170. Chamber 198 may be referred to as a release chamber and is at least partially defined by cover 134 and piston plate 170. Clutch assembly 168 is engaged and disengaged by fluid pressure acting on piston plate 170. Fluid pressure in apply chamber 196 urges piston plate 170 towards engagement with cover 134, while fluid pressure in chamber 198 urges piston plate 170 away from engagement with cover 134. Fluid enters chambers 196 and 198 through a transmission input shaft (not shown).

In order to change from a clutch release state to a clutch apply state, pressure in chambers 196 and 198 is reversed. That is, torque converter 100 has a higher pressure in chamber 198 when clutch 168 is in release mode. In order to engage clutch 168, pressure in chamber 196 must be higher than pressure in chamber 198. Therefore, pressure in chamber 196 is raised and/or pressure in chamber 198 is lowered to engage clutch 168. Even through pressure in chamber 196 may be higher, leakage between piston plate 170 and clutch plate 172 may equalize pressure in chambers 196 and 198 while the clutch is being engaged. That is, piston plate 170 seals to friction material 188 when clutch 168 is applied, but allows leakage before the two components are sealed. Leakage between piston 170 and friction material 188 may make it difficult to build pressure in chamber 196 to fully engage clutch 168.

Furthermore, hydrodynamic effects in the torque converter affect engagement of clutch 168. For example, hydrodynamic effects urge piston plate 170 in the direction of the faster-spinning component. Therefore, since piston plate 170 is axially disposed between cover 134 and damper 150, piston plate will be urged towards cover 134 when impeller 102 spins faster than turbine 114 (drive mode) and away from cover 134 when turbine 114 spins faster than impeller 102 (coast mode). Otherwise stated, piston plate 170 tends to be self-engaging in drive mode and self-disengaging in coast mode. Therefore, it may be difficult to engage clutch 168 when converter 100 is in coast mode because fluid pressure in chamber 196 leaks into chamber 198 through the axial gap between piston 170 and clutch plate 172. It should be noted that, although FIG. 2 shows the gap between piston 170 and plate 172, the gap may be between cover shell 138 and plate 172, or a portion of the gap may be between each pair.

Figure 3A:
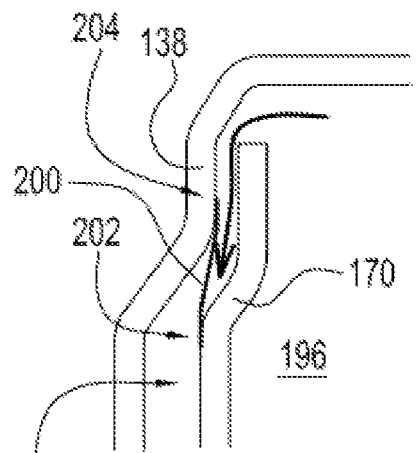
FIG. 3A is a schematic view of the torque converter of FIG. 2 with a deflectable sealing plate shown in an apply state, according to an example aspect.
Figure 3B:
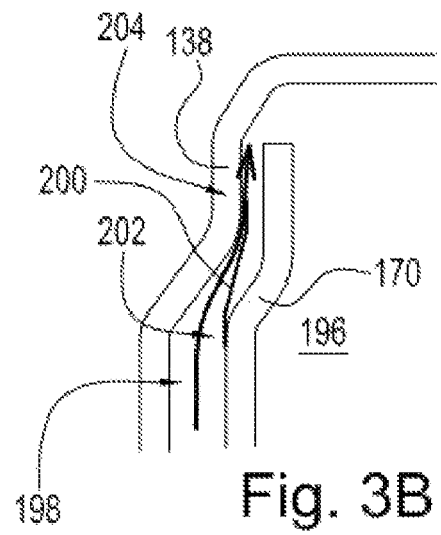
FIG. 3B is a schematic view of the torque converter of FIG. 2 with a deflectable sealing plate, shown in a release state, according to an example aspect.
Figure 3C:
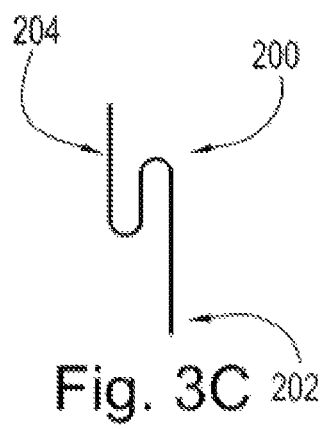
FIG. 3C is a section view of a sealing plate shown with a zig-zag shape.
Figure 3D:
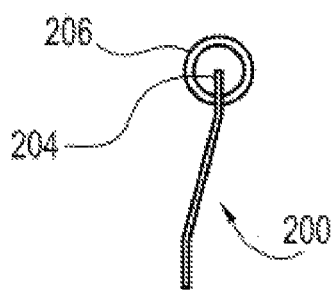
FIG. 3D is a section view of a sealing plate shown with circular sealing element 206.

The following description is made with reference to FIGS. 3A-3D. FIG. 3A is a schematic view of torque converter 100 of FIG. 2 with deflectable sealing plate 200 shown in an apply state, according to an example aspect. FIG. 3B is a schematic view of torque converter 100 of FIG. 2 with deflectable sealing plate 200, shown in a release state, according to an example aspect. FIG. 3C is a section view of sealing plate 200 shown with a zig-zag shape. FIG. 3D is a section view of sealing plate 200 shown with circular sealing element 206. Converter 100 includes cover 138 and piston plate 170 as described supra. In the embodiment shown in FIGS. 3A-3D, converter 100 includes deflectable sealing plate 200.

Plate 200 is disposed axially between cover 138 and annular piston plate 170, and is fixedly attached to piston 170 at attachment point 202. Plate 200 may be attached to piston 170 with rivets or welding, for example. Plate 200 is arranged to seal to cover 138 at sealing portion 204 to minimize fluid exchange between chambers 196 and 198. Although plate 200 is shown attached to piston plate 170, other configurations exist and should be considered within the scope. For example, plate 200 may be fixed to cover 138 and arranged to seal to piston 170. Therefore, as can be seen in FIG. 3A, pressure from chamber 196 leaking between cover shell 138 and piston 170 is restricted from entering chamber 198, improving engagement of clutch assembly 168.

Converter 100 requires significant cooling flow during release mode. Cooling flow enters chamber 198 from the input shaft (not shown) and exits to from port 196. In the configuration shown in FIG. 3A, seal 200 blocks flow between the chambers so the cooling flow may be insufficient and converter 100 may overheat. However, as can be seen in FIG. 3B, seal 200 is deflectable to allow flow between the chambers when pressure is higher in chamber 198. That is, pressure in chamber 198 urges seal 200 away from shell 138 allowing flow between the chambers to cool converter 100.

As described supra, piston 170 and cover shell 138 rotate together. Therefore, deflectable seal 200 may be a metal plate without risk of wear or grinding between seal 200 and shell 138 because there is no relative rotation. Seal 200 may include a seal material (not shown) at portion 204 to improve sealing between plate 200 and shell 138. For example, seal 200 may include friction material at portion 204. Seal 200 may include additional bends and radial walls between portions 202 and 204 for increased flexibility. For example, seal 200 may have a "zig-zag" form as shown in FIG. 3C. Seal 200 may include ring 206 with a circular cross-section installed over portion 204 as shown in FIG. 3D.

The following description is made with reference to FIGS. 4A-4C. FIG. 4A is a schematic view of torque converter 100 of FIG. 2 with deflectable sealing plate 200A shown in an apply state, according to an example aspect. FIG. 4B is a schematic view of torque converter 100 of FIG. 2 with deflectable sealing plate 200A, shown in a release state, according to an example aspect. FIG. 4C is a back view of seal 200A. Plate 200A is sealed to piston 170 with extruded rivet 208. In general, plates 200 and 200A perform the same function. However, plate 200 seals against a radial wall of shell 138 while plate 200A seals against a conical wall of shell 138. As shown in FIG. 4C, seal 200A is a metal ring with radial tabs 210 having apertures 212 for receiving rivets 208. Ring 200A may also include radial slots 214 for increased flexibility. Operation of seal 200A is as described for seal 200.

The following description is made with reference to FIGS. 5-7. FIG. 5 is a top half cross-sectional view of a portion of clutch assembly 300 with deflectable seal 302, according to an example aspect. Seal 302 includes portion 304 fixed to piston plate 306 by riveting, for example, and portion 308 fixed to portion 304. Portion 308 may be a rubber seal portion bonded to portion 304. In general, seal 302 seals piston plate 306 to cover shell 310 in clutch apply mode and deflects in clutch release mode similar to seal 200 described above. Seal 302 may include orifice 312. Orifice 312 prevents pressure buildup between clutch plate 314 and seal 302 during clutch apply. That is, any pressure trapped in chamber 316 during clutch apply drains into chamber 318 to improve clutch engagement. Although orifice 312 is shown in portion 308, other embodiments may include orifice 312 in portion 304.

FIG. 6 is a top half cross-sectional view of a portion of clutch assembly 400 with deflectable seal 402, according to an example aspect. Seal 402 includes portion 404 fixed to piston plate 406 by riveting, for example, and portion 408 fixed to portion 404. Portion 408 may be a rubber seal portion bonded to portion 404. In general, seal 402 seals piston plate 406 to cover shell 410 in clutch apply mode and deflects in clutch release mode similar to seal 200 described above. Cover 410 includes circumferential wall 412 in sealing engagement with seal 402. Wall 412 is a coined, or stamped, feature of shell 410 and is integral with shell 410. In other embodiments (described infra), wall 412 is a portion of an additional element fixedly attached to shell 410.

FIG. 7 is a top half-cross sectional view of a portion of clutch assembly 500 with deflectable seal 502, according to an example aspect. Seal 502 includes portion 504 fixed to piston plate 506 by riveting, for example, and portion 508 fixed to portion 504. Portion 508 may be a rubber seal portion bonded to portion 504. Portion 508 includes flap 509 for deflecting. In general, seal 502 seals piston plate 506 to cover assembly 510 in clutch apply mode and deflects in clutch release mode similar to seal 200 described above. Cover 510 includes circumferential wall 512 in sealing engagement with seal 502. Wall 512 is a portion of element 514 fixedly attached to shell 516 at weld 518.

The following description is made with reference to FIG. 8. FIG. 8 is a top half cross-sectional view of torque converter 600 with clutch assembly 602 having deflectable seal 618, according to an example aspect. Assembly 602 includes piston plate 604 and seal plates 606 and 608 fixed to piston plate 604 by riveting, for example. Seal 610 is disposed between plates 606 and 608 and seals piston plate 604 to cover shell 612 at circumferential surface 614.

Piston plate 604 includes orifice 616. Clutch assembly 602 includes deflectable seal 618 fixedly attached to piston plate 604 by rivet 620. Seal 618 is arranged to restrict fluid flow through orifice 616. That is, during apply mode, seal 618 covers orifice 616 preventing flow of fluid between chambers 622 and 624. In release mode, seal 618 deflects, allowing fluid flow between chambers 622 and 624 to cool converter 600 as described supra.

The following description is made with reference to FIGS. 8-9B. FIG. 9A is a front view of seal 618 of FIG. 8. Seal 618A includes elongated body 650 with apertures 652 and 654. Length of body 650 increases flexibility of seal 618. Rivet 620 is disposed in aperture 652. An additional rivet or protrusion (not shown) is disposed in aperture 654 to ensure seal 618A is disposed over orifice 616. That is, aperture 654 is to control circumferential position of seal 618A relative to an axis passing through aperture 652. Optional friction material pad 656 may be bonded to body 650 to improve sealing performance. Although friction material is specified, other materials may be used to improve sealing. For example, rubber or elastomers may be used to improve sealing.

FIG. 9B is a front view of an alternative embodiment of seal 618 of FIG. 8. Seal 618B includes annular ring portion 660 with apertures 662 and radial tabs 664. Rivets 620 is disposed in apertures 662. Tabs 664 are disposed over orifices 616. Option friction material pads 666 may be bonded to tabs 664 to improve sealing performance.

The following description is made with reference to FIGS. 10-11. FIG. 10 is a cross-sectional view of a portion of clutch assembly 700, according to an example aspect. Clutch assembly 700 includes piston plate 702 and clutch plate 704. Sealing plate 706 is fixed to piston plate 702 by weld 708. Plate 706 includes annular groove 710. Seal 712 is disposed in groove 710, and seals plate 706 to cover assembly 714 at circumferential surface 716. Surface 716 is a portion of element 718 fixed to cover shell 720 by weld 722. Although element 718 is shown as a separate component, surface 716 may be integral with shell 720 as described supra. Operation of clutch assembly 700 is similar to operation of clutch assembly 602 described supra.

FIG. 11 is a cross-sectional view of a portion of clutch assembly 800, according to an example aspect. Assembly 800 includes piston plate 802 and sealing plate 804 fixed to piston plate 802 by rivet 806. Plates 802 and 804 include respective circumferential walls 808 and 810, and radial walls 812 and 814 forming portions of annular groove 816 for receiving a seal (not shown). Remaining features of clutch assembly 800 are similar to clutch assembly 700 described supra.

Of course, changes and modifications to the above examples should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A torque converter assembly comprising:
   a cover for driving engagement with a prime mover;
   a piston plate including an annular surface for engaging a clutch; and,
   a sealing plate, fixedly attached to the piston plate, comprising a substantially radial wall arranged between the cover and the piston plate and disposed radially inward of the annular surface, wherein:
   in a lockup mode for the torque converter, the sealing plate blocks fluid flow between the cover and the piston plate; and,
   in a release mode for the torque converter, the sealing plate is deflectable to enable a fluid flow between the cover and the piston plate via a pathway between one of the cover and the sealing plate or the sealing plate and the piston plate.

2. The torque converter assembly of claim 1 wherein the sealing plate is arranged for sealing engagement with the cover.

3. The torque converter assembly of claim 2 wherein the sealing plate includes a flap portion deflectable to:
   block the fluid flow between the cover and the piston plate; or,
   enable the fluid flow between the cover and the piston plate via a pathway between the cover and the sealing plate.

4. The torque converter assembly of claim 3 wherein the cover has an inner surface and wherein, during the lockup mode, the sealing plate flap is in contact with the inner surface of the cover.

5. A torque converter assembly comprising:
   a cover for driving engagement with a prime mover;
   a piston plate including an annular surface for engaging a clutch; and,
   a sealing plate comprising a substantially radial wall arranged between the cover and the piston plate and disposed radially inward of the annular surface, wherein:
   in a lockup mode for the torque converter, the sealing plate blocks fluid flow between the cover and the piston plate; and,
   in a release mode for the torque converter, the sealing plate is deflectable to enable a fluid flow between the cover and the piston plate via a pathway between one of the cover and the sealing plate or the sealing plate and the piston plate;
   wherein the sealing plate comprises a sheet metal ring fixed to one of the piston plate or the cover and arranged for sealing engagement with the other of the piston plate or the cover when the torque converter is in the lockup mode; and, wherein, during the lockup mode, the sheet metal ring is in contact with the other of the piston plate or the cover.

6. The torque converter assembly of claim 5 wherein the sealing plate further comprises a sealing portion including rubber or friction material bonded to the sheet metal ring and, during the lockup mode, the sealing portion is in contact with the other of the piston plate or the cover.

7. A torque converter assembly comprising:
a cover for driving engagement with a prime mover;
a piston plate including an annular surface for engaging a clutch; and,
a sealing plate comprising a substantially radial wall arranged between the cover and the piston plate and disposed radially inward of the annular surface, wherein:
in a lockup mode for the torque converter, the sealing plate blocks fluid flow between the cover and the piston plate; and,
in a release mode for the torque converter, the sealing plate is deflectable to enable a fluid flow between the cover and the piston plate via a pathway between one of the cover and the sealing plate or the sealing plate and the piston plate;
wherein the sealing plate further comprises:
a sealing portion and
friction material bonded to the sealing portion; and,
in the lockup mode, the friction material blocks fluid flow between the cover and the piston plate; and,
in the release mode, the friction material is displaceable to enable fluid flow between the cover and the piston plate via a pathway between one of the cover and the friction material or the friction material and the piston plate.

8. A torque converter assembly comprising:
a cover for driving connection to a prime mover;
an impeller drivingly connected to the cover;
a piston plate;
a first chamber at least partially defined by the cover and the piston plate;
a second chamber at least partially defined by the cover, the impeller, and the piston plate; and,
a deflectable seal comprising a substantially radial wall arranged between the cover and the piston plate and fixed to one of the cover or the piston plate for sealing engagement with the other of the piston plate or the cover, wherein:
in a first position, the deflectable seal is disengaged from the other of the cover or the piston plate to enable a flow around the seal from the first chamber to the second chamber; and,
in a second position, the deflectable seal is engaged with the other of the cover or the piston plate to block a flow from the second chamber to the first chamber.

9. The torque converter assembly of claim 8 further comprising a sheet metal plate fixed to the piston plate, wherein:

the deflectable seal is fixed to the sheet metal plate, arranged for sealing engagement with the cover, and includes a flap portion deflectable to:
enable the flow from the first chamber to the second chamber; or,
block the flow from the second chamber to the first chamber.

10. The torque converter assembly of claim 8 wherein the deflectable seal comprises a sheet metal ring fixed to one of the piston plate or the cover and arranged for sealing engagement with the other of the piston plate or the cover to block the flow from the second chamber to the first chamber.

11. The torque converter assembly of claim 10 wherein the deflectable seal further comprises a sealing portion bonded to the sheet metal ring and contactable with the other of the piston plate or the cover to block the flow from the second chamber to the first chamber.

12. A torque converter assembly comprising:
a cover for driving engagement with a prime mover and including:
a shell; and,
a circumferential wall;
a piston plate including an annular surface for engaging a clutch; and,
a deflectable seal comprising a substantially radial wall arranged between the cover and the piston plate and disposed radially inward of the annular surface, wherein:
in a lockup mode for the torque converter, the circumferential wall is in sealing engagement with the seal to block fluid flow between the cover and the piston plate; and,
in a release mode for the torque converter, the seal is deflectable to enable a fluid flow between the cover and the piston plate via a pathway between the circumferential wall and the seal.

13. The torque converter assembly of claim 12 wherein the seal includes:
a first portion fixedly attached to the piston plate; and
a second portion fixed to the first portion.

14. The torque converter assembly of claim 13 wherein the second portion includes a flap for deflecting.

15. The torque converter assembly of claim 13 wherein the second portion is a rubber seal portion.

16. The torque converter assembly of claim 12 where the circumferential wall is fixedly attached to the shell.

17. The torque converter assembly of claim 12 wherein the seal further comprises:
a sealing portion and
friction material bonded to the sealing portion; and,
in the lockup mode, the friction material blocks fluid flow between the cover and the piston plate; and,
in the release mode, the friction material is displaceable to enable fluid flow between the cover and the piston plate via a pathway between the circumferential wall and the friction material.

* * * * *